UNITED STATES PATENT OFFICE.

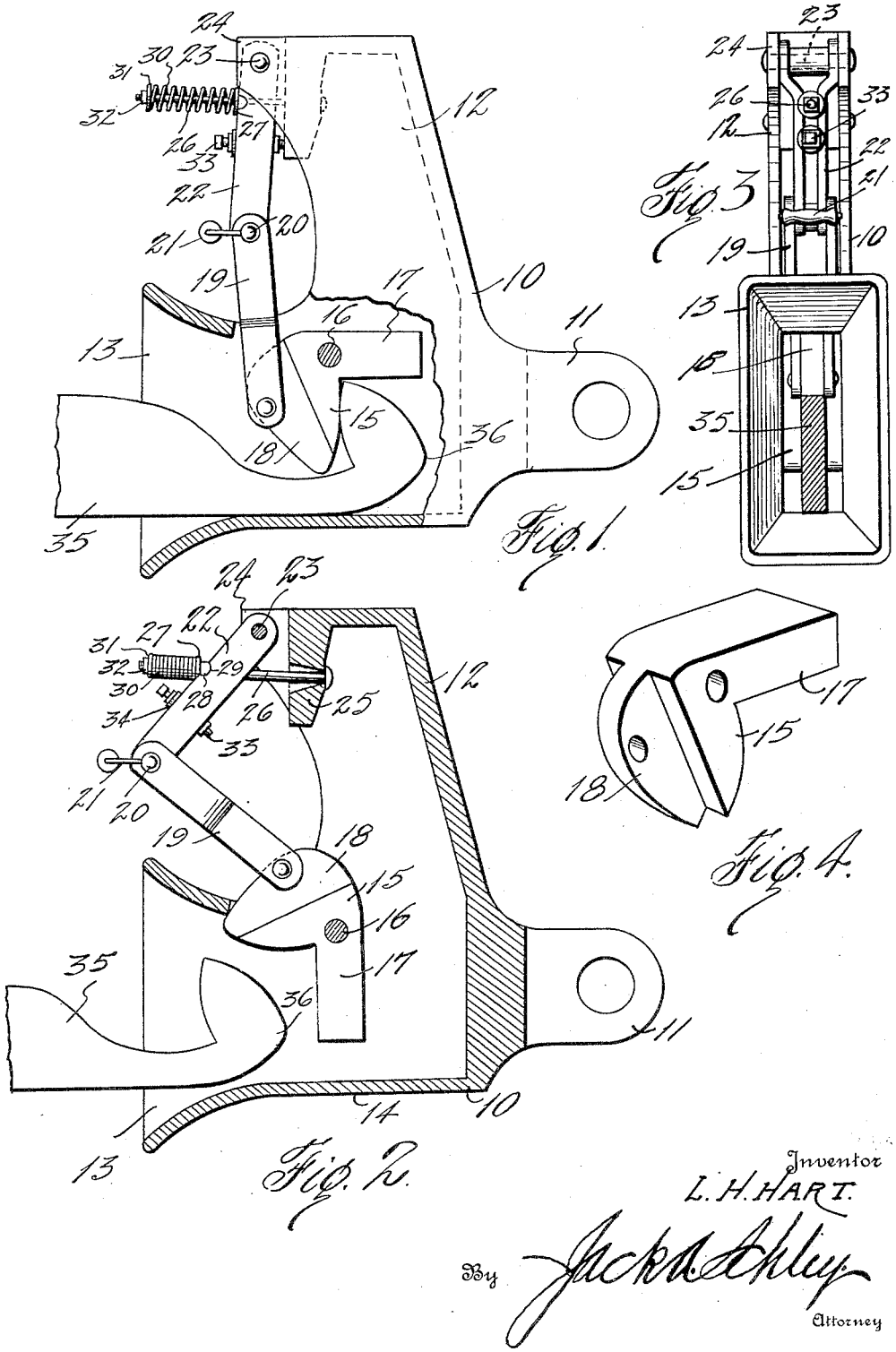

LAWRENCE H. HART, OF MAYPEARL, TEXAS.

TRACTOR-COUPLING.

1,362,863.   Specification of Letters Patent.   Patented Dec. 21, 1920.

Application filed April 28, 1920. Serial No. 377,149.

*To all whom it may concern:*

Be it known that I, LAWRENCE H. HART, a citizen of the United States, residing at Maypearl, in the county of Ellis and State of Texas, have invented certain new and useful Improvements in Tractor-Couplings, of which the following is a specification.

This invention relates to new and useful improvements in tractor couplings.

The object of the invention is to provide a coupling which may be attached to a tractor to connect the same with the beam of a plow and so arranged that when the plow strikes an obstruction the coupling will automatically disengage from the plow whereby the plow will be freed and the tractor permitted to proceed without breaking any of the parts. It is also proposed to arrange the coupling so that the tractor may be backed up to the plow and the implements coupled together without manual assistance.

In carrying out the invention a coupling housing is provided with a spring held latch and arranged to receive the coupling head of the plow which enters the housing and engages the latch. The latch is arranged so that when the plow strikes an obstruction the spring connection will yield permitting the latch to swing and release the plow head or coupling member.

The invention will be more readily understood from a reading of the following specification and by reference to the accompanying drawings, in which an example of the invention is shown, and wherein:

Figure 1 is a plan view of a coupling constructed in accordance with this invention, a portion being illustrated in section, Fig. 2 is a horizontal cross-sectional view of the coupling, Fig. 3 is a front elevation of the same, and Fig. 4 is a perspective view of the latch.

In the drawing the numeral 10 designates a coupling housing which has an ear 11 at its rear end which is adapted to be pivoted to the tractor which is not shown. The housing has an offset bracket 12. At the front end of the housing a flaring collar 13 is provided and this collar at one side is contiguous to the end wall 14 of the housing. The collar extends forward from the body of the housing as is shown in the drawing.

Within the housing a latch 15 is transversely pivoted on a vertical pin 16. The latch has an arm 17 extending at right angles and is also provided with a reduced ear 18. A pair of links 19 are pivoted at one end to the ear 18 and have their other ends pivoted on a pin 20 to which a bail 21 is also pivoted. A second pair of links 22 have pivoted connection with the pin 20 at one end, while their opposite ends are pivoted on a pin 23 supported between ears 24 of the bracket 12.

The bracket 12 is provided with a web 25 adjacent the ears 24. A bolt 26 is loosely confined in the web as is shown in Fig. 2. This bolt extends outward between the links 22 and receives a collar 27 which is provided with rounded bosses 28 engaging in notches 29 in the outer edges of the links 22. A coil spring 30 is confined on the bolt between the collar 27 and a washer 31 by means of a nut 32. This spring acts to force the links inward and hold them as is shown in Fig. 1. For limiting the inward movement of the links a set-screw 33 is mounted in a lug 34 fastened between the links 22. This screw engages the web 25 and by adjusting said screw the inward or closed position of the links is regulated.

The plow beam is provided with a coupling head 35 which is in the form of a hook having a nose 36 at its forward end. It will be seen that with the parts in the position shown in Fig. 2, the arm 17 of the latch projects across the housing in the path of the head 35. When the tractor is backed up to the plow the head 35 will be received in the collar 13 which owing to its flaring construction will guide the head into the housing. The arm 17 will be brought into contact with the nose 36 and will ride down the same until the latch 15 is swung under the hook of the head as is shown in Fig. 1. When this is accomplished the links 19 and 22 will be straightened out as is shown in Fig. 1 but not quite in alinement. When the plow strikes an obstruction the head 35 will exert such a pressure on the latch 15 as to cause the links to buckle outward against the tension of the spring 30 whereby the latch will be swung and the head released. This action is very similar to the brake joint connection which is commonly used on cultivator plow beams. When it is desired to uncouple the tractor from the plow the bail 21 is grasped and the links pulled outward whereby the latch is swung and the head released.

It will be noted that the head 35 engages the latch 15 at a point substantially in the line of draft and in longitudinal alinement with the point of connection of the links 19 with the ear 18 and thus under ordinary conditions the parts will remain coupled, but when an obstruction is encountered the pull exerted will be sufficient to displace the plow head 35, buckle the links and swing the latch, thus releasing or uncoupling the plow and tractor as will be obvious. It will be seen that with the parts in the position shown in Fig. 2 the tractor may be backed up to the plow and a coupling effected when the head 35 is received in the housing 10 into which it is guided by the flared collar 13.

What I claim is:

1. In a tractor coupling, a housing, a latch pivoted in the housing, a pair of spring pressed jointed links pivoted at one end to the housing and connected at the other end with the latch, and means for placing the links under spring tension, in combination with a coupling head adapted to be received in the housing and engaged with the latch.

2. In a tractor coupling, a housing having a flaring collar for receiving a plow coupling member, a latch pivoted in the housing and having an arm arranged to be disposed in the path of the coupling member entering the housing for swinging the latch to engage the coupling member and fasten the parts together, links pivoted together and having one end pivoted to the latch and the opposite end pivoted to the housing, and a spring tension device exerting pressure on the links.

3. In a tractor coupling, a housing having a flaring collar for receiving a plow coupling member, a latch pivoted in the housing and having an arm arranged to be disposed in the path of the coupling member entering the housing for swinging the latch to engage the coupling member and fasten the parts together, links pivoted together and having one end pivoted to the latch and the opposite end pivoted to the housing, a spring tension device exerting pressure on the links, and a bail engaging the joint between the links for displacing said links outward to swing the latch and uncouple the coupling member.

In testimony whereof I affix my signature.

LAWRENCE H. HART.